United States Patent
Takahashi

(10) Patent No.: US 12,106,490 B2
(45) Date of Patent: Oct. 1, 2024

(54) APPARATUS FOR DETECTING MOVING OBJECT, METHOD FOR DETECTING MOVING OBJECT, AND NON-TRANSITORY COMPUTER-READABLE STORAGE MEDIUM

(71) Applicant: CANON KABUSHIKI KAISHA, Tokyo (JP)

(72) Inventor: Yoichi Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 378 days.

(21) Appl. No.: 17/701,353

(22) Filed: Mar. 22, 2022

(65) Prior Publication Data

US 2022/0309683 A1 Sep. 29, 2022

(30) Foreign Application Priority Data

Mar. 26, 2021 (JP) ................................. 2021-053339

(51) Int. Cl.
*G06T 7/215* (2017.01)
*G06T 7/207* (2017.01)
*G06T 7/90* (2017.01)

(52) U.S. Cl.
CPC .............. *G06T 7/215* (2017.01); *G06T 7/207* (2017.01); *G06T 7/90* (2017.01); *G06T 2207/10148* (2013.01)

(58) Field of Classification Search
CPC .......... G06T 7/215; G06T 7/207; G06T 7/90; G06T 2207/10148
USPC .......................................................... 382/103
See application file for complete search history.

(56) References Cited

U.S. PATENT DOCUMENTS

| | | | |
|---|---|---|---|
| 8,736,704 B2* | 5/2014 | Jasinski | H04N 23/951 348/222.1 |
| 2015/0163391 A1* | 6/2015 | Osawa | G06V 10/141 348/222.1 |
| 2018/0075617 A1* | 3/2018 | Abe | H04N 23/67 |
| 2020/0036895 A1* | 1/2020 | Midorikawa | G06T 7/215 |
| 2021/0105413 A1* | 4/2021 | Suzuki | H04N 23/675 |
| 2021/0195100 A1* | 6/2021 | Shiota | H04N 23/951 |

FOREIGN PATENT DOCUMENTS

JP 2015216485 A 12/2015

* cited by examiner

*Primary Examiner* — Allen H Nguyen
(74) *Attorney, Agent, or Firm* — Canon U.S.A., Inc. IP Division

(57) ABSTRACT

An apparatus includes at least one memory configured to store instructions, and at least one processor in communication with the at least one memory and configured to execute the instructions to acquire a first evaluation value related to a change in color or luminance from a plurality of images different in focus position, acquire a second evaluation value related to a change in contrast from the plurality of images, and detect a moving object from the plurality of images based on the first evaluation value and the second evaluation value.

20 Claims, 7 Drawing Sheets

APPARATUS FOR DETECTING MOVING OBJECT, METHOD FOR DETECTING MOVING OBJECT, AND NON-TRANSITORY COMPUTER-READABLE STORAGE MEDIUM

BACKGROUND

Field of the Disclosure

The aspect of the embodiments relates to an apparatus for detecting a moving object.

Description of the Related Art

There has been conventionally known a focus stacking technique by which focused areas are extracted from a plurality of images obtained by performing image-capturing a plurality of times at the same angle of view and combined into a composite image with greater depth of field (Japanese Patent Application Laid-Open No. 2015-216485).

If a moving object is included in subject images captured for focus stacking, the quality of a composite image will become deteriorated. As a possible method for excluding the moving object from the composition targets, areas with great differences in color or luminance are extracted and set as areas of the moving object.

According to the above method, however, non-moving object areas with differences in color or luminance resulting from blurring may be wrongly recognized as moving object areas.

SUMMARY OF THE DISCLOSURE

According to an aspect of the disclosure, an apparatus includes at least one memory configured to store instructions, and at least one processor in communication with the at least one memory and configured to execute the instructions to acquire a first evaluation value related to a change in color or luminance from a plurality of images different in focus position, acquire a second evaluation value related to a change in contrast from the plurality of images, and detect a moving object from the plurality of images based on the first evaluation value and the second evaluation value.

Further features of the disclosure will become apparent from the following description of exemplary embodiments with reference to the attached drawings.

DESCRIPTION OF THE EMBODIMENTS

An exemplary embodiment of the disclosure will be described with reference to the accompanying drawings.

Figure 1:
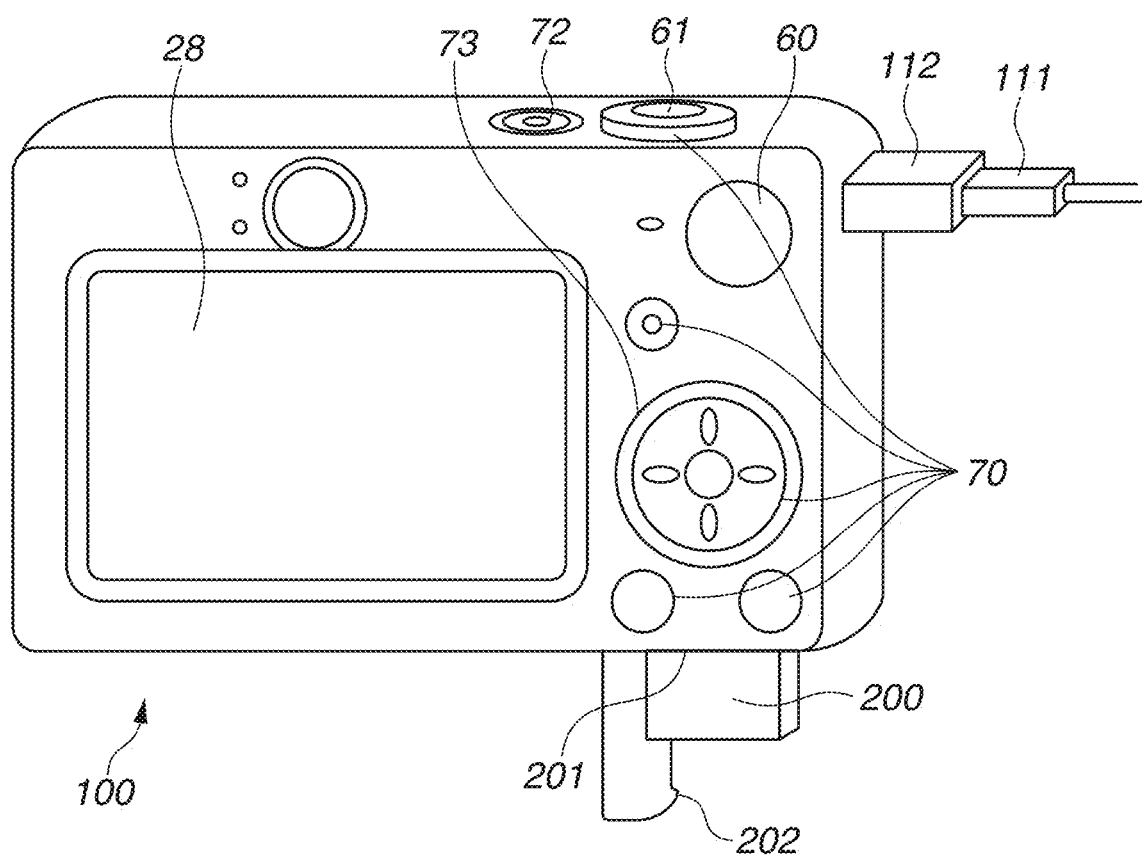
FIG. 1 is an external view of a digital camera as an example of an image processing apparatus according to an exemplary embodiment of the disclosure.

A first exemplary embodiment will be described below. FIG. 1 illustrates an external view of a digital camera 100 as an example of an image processing apparatus according to the present exemplary embodiment. A display unit 28 is a display unit that displays images and various types of information. A shutter button 61 is an operation unit for issuing an imaging instruction. A mode selection switch 60 is an operation unit for switching among various modes. A connector 112 is a connector for connecting the digital camera 100 to a connection cable 111. An operation unit 70 is an operation unit that includes operation members such as various switches, buttons, and touch panel for accepting various operations by the user. A controller wheel 73 is a rotationally-operable operation member that is included in the operation unit 70. A power switch 72 switches between power-on and power-off. A recording medium 200 is a recording medium such as a memory card, hard disk, or the like. A recording medium slot 201 is a slot for storing the recording medium 200. The recording medium 200 stored in the recording medium slot 201 is communicable with the digital camera 100. A lid 203 is a lid of the recording medium slot 201.

Figure 2:
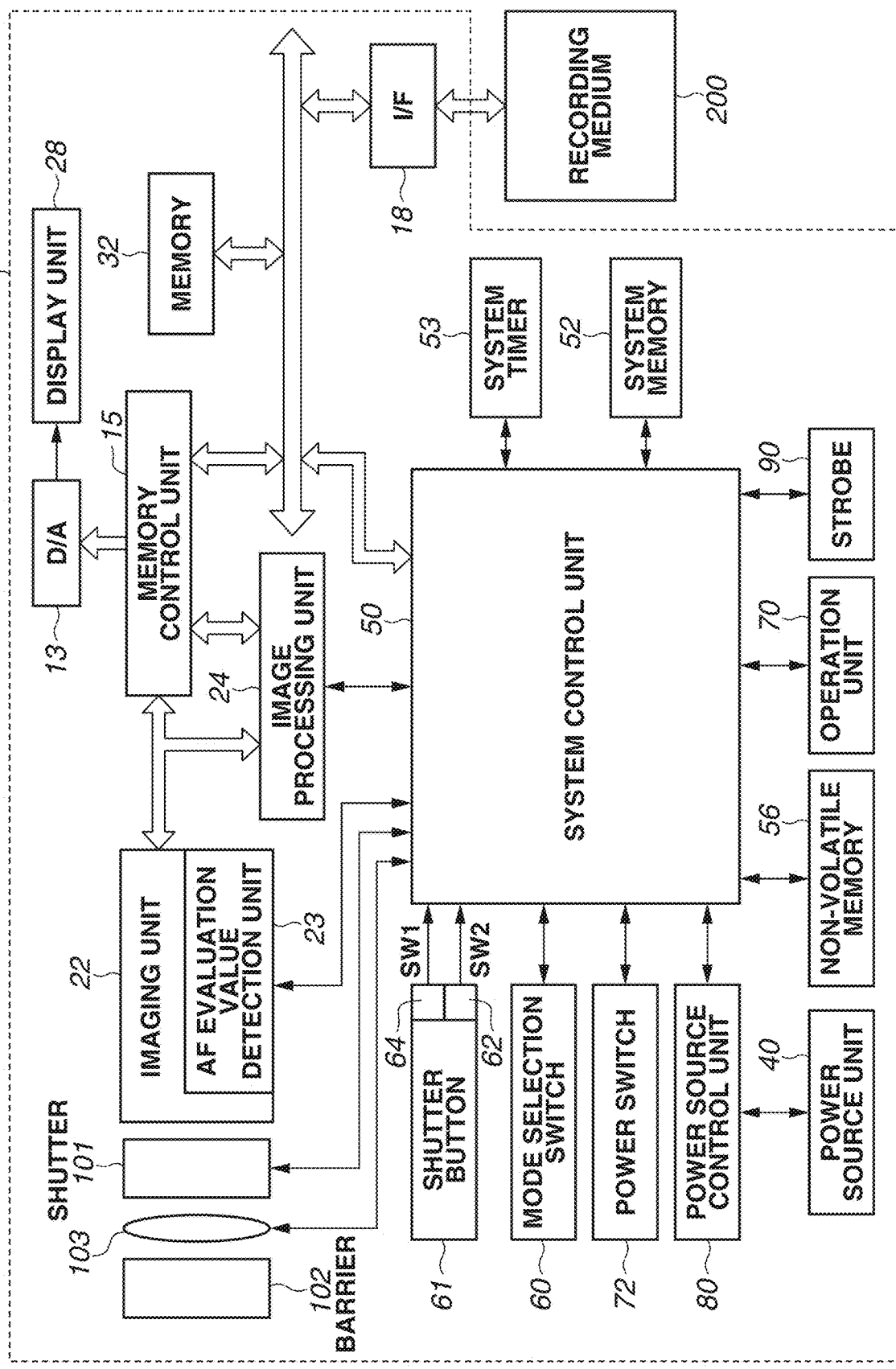
FIG. 2 is a block diagram illustrating a configuration example of the digital camera according to the exemplary embodiment of the disclosure.

FIG. 2 is a block diagram illustrating a configuration example of the digital camera 100 according to the present exemplary embodiment.

Referring to FIG. 2, an imaging lens 103 is a lens group including a zoom lens and a focus lens. A shutter 101 is a shutter having an aperture function. An imaging unit 22 is an imaging element including a charge-coupled device (CCD) sensor or a complementary metal-oxide semiconductor (CMOS) sensor for converting an optical image into an electric signal. The imaging element includes two-dimensionally arranged pixels that each include a plurality of photoelectric conversion areas. The imaging element can acquire a plurality of parallax images different in viewpoint based on outputs from photoelectric conversion area groups existing at the same positions in the pixels. For the plurality of parallax images, the outputs of the plurality of photoelectric conversion areas in each pixel are added up to acquire a captured image that can be obtained by a typical imaging element in which each pixel has one photoelectric conversion area. In the present exemplary embodiment, each pixel is formed of two independent photoelectric conversion areas (photodiodes) A and B. Two parallax images A and B can be obtained by acquiring the output of the photoelectric conversion area A and the output of the photoelectric conversion area B, respectively, as independent images. A normal captured image can be acquired by adding up the outputs of the photoelectric conversion areas A and B in each pixel. In the present exemplary embodiment, a description is given using an example where a captured image is obtained by adding and combining a plurality of parallax images by an image processing unit 24 described below. Alternatively, the adding and combining of the parallax images may be performed by the imaging unit 22. In the above described manner, the parallax images A and B and the captured image can be acquired by a single imaging operation (exposure). In the present exemplary embodiment, the two parallax images are acquired at the same time. However, more parallax images may be acquired at the same time by receiving a light flux incident in the vicinity of the imaging area by using a larger number of pixels (for example, 3×3 pixels). The imaging unit 22 includes an analog/digital (A/D) conversion processing function. An autofocus (AF) evaluation value detection unit 23 calculates an AF evaluation value from contrast information obtained from a digital image signal and from a phase difference obtained from the parallax images, and outputs the obtained AF evaluation value from the imaging unit 22 to a system control unit 50. A barrier 102 covers the imaging system, including the imaging lens 103, in the digital camera 100 to prevent dirt and breakage of the imaging system including the imaging lens 103, the control unit 101, and the imaging unit 22. A strobe 90 can emit light at the time of image capturing to supplement illuminance at the time of image capturing in a low-illuminance scene or in a backlit scene.

The image processing unit 24 performs a predetermined pixel interpolation, resize processing such as reduction, or color conversion processing on image data output from the imaging unit 22 or image data from a memory control unit 15.

The image processing unit 24 can acquire subject range information on a subject. The image processing unit 24 can determine the distance to the subject by detecting a phase difference between two input parallax images, and acquire the range information on the distance from the imaging unit 22 to the subject for each pixel. In the present exemplary embodiment, the distance to the subject is acquired from the phase difference between two parallax images. Alternatively, image capturing may be performed by the imaging unit 22 while driving the imaging lens 103 and the distance to the subject may be acquired based on a contrast value in each block as an evaluation value.

The image processing unit 24 performs predetermined calculation processing using the captured image data, and the system control unit 50 performs exposure control and ranging control based on the obtained calculation results. With the foregoing controls, through-the-lens (TTL)-type auto-exposure (AE) processing and electronic flash pre-emission (EF) processing can be performed. The image processing unit 24 may also perform AF processing using the output from the AF evaluation value detection unit 23 included in the imaging unit 22. The image processing unit 24 further performs predetermined calculation processing using the captured image data and performs TTL-type auto white balance (AWB) processing based on the obtained calculation result.

The output data from the imaging unit 22 is written into a memory 32 via the image processing unit 24 and the memory control unit 15 or via the memory control unit 15. The memory 32 stores image data acquired and subjected to A/D conversion by the imaging unit 22 and image data for display on the display unit 28. The memory 32 has a storage capacity enough to store a predetermined number of still images and a predetermined time of moving images and sounds.

The memory 32 also serves as a memory for image display (video memory). A digital-to-analog (D/A) converter 13 converts the data for image display stored in the memory 32 into an analog signal and supplies the converted data to the display unit 28. Accordingly, the image data for display written into the memory 32 is displayed on the display unit 28 via the D/A converter 13. The display unit 28 provides display in accordance with the analog signal from the D/A converter 13, on a display device such as a light-emitting diode (LCD). The digital signals once converted from analog signals by the imaging unit 22 and accumulated in the memory 32 are converted into analog signals by the D/A converter 13 and sequentially transferred to the display unit 28 for display. Thus, the imaging unit 22 functions as an electronic viewfinder that provides live view display.

A non-volatile memory 56 is an electrically recordable and erasable memory, for example, a flash memory or the like. The non-volatile memory 56 stores constants and programs for operation of the system control unit 50. The programs here refer to programs for executing processing in a flowchart described below according to the present exemplary embodiment.

The system control unit 50 controls the entire digital camera 100. The system control unit 50 executes the programs recorded in the non-volatile memory 56 described above to implement each processing described below in the present exemplary embodiment. A system memory 52 is a random-access memory (RAM). The system memory 52 loads the constants and valuables for operation of the system control unit 50 and the programs read from the non-volatile memory 56. The system control unit 50 also performs display control by controlling the D/A converter 13 and the display unit 28.

A system timer 53 is a clocking unit that measures times used for various controls and a time of a built-in clock.

The mode selection switch 60, a first shutter switch 64, a second shutter switch 62, and the operation unit 70 are operation units for inputting various operation instructions to the system control unit 50.

The mode selection switch 60 switches the operation mode of the system control unit 50 among a still image recording mode, a moving image recording mode, a playback mode, and the like. The still image recording mode includes an auto imaging mode, an automatic scene determination mode, a manual mode, various scene modes that are image capture settings for various imaging scenes, a program AE mode, a custom mode, and the like. The mode selection switch 60 directly switches the operation mode to any of these modes included in the still image recording mode. Alternatively, after the operation mode is switched by the mode selection switch 60 to the still image recording mode, another operation member may be used to switch the operation mode to any of these modes included in the still image recording mode. Similarly, the moving image capturing mode may include a plurality of modes. The first shutter switch 64 is turned on by half-pressing the shutter button 61 provided in the digital camera 100 (imaging preparation instruction) to generate a first shutter switch signal SW1. The AF processing, the AE processing, the AWB processing, and the EF processing are started based on the generated first shutter switch signal SW1.

The second shutter switch 62 is turned on by completing an operation on the shutter button 61, i.e., fully pressing the shutter button 61 (imaging instruction) to generate a second shutter switch signal SW2. Based on the second shutter switch signal SW2, the system control unit 50 starts a series of operations in the imaging process from reading a signal from the imaging unit 22 to writing image data into the recording medium 200.

The operation members in the operation unit 70 are assigned appropriate functions for each scene by selectively operating various function icons displayed on the display unit 28, and then act as various function buttons. Examples of the function buttons include an end button, a return button, an image forward button, a jump button, a narrowing-down button, and an attribute change button. For example, when a menu button is pressed, a menu screen allowing various settings is displayed on the display unit 28.

The user can intuitively make various settings by using the menu screen displayed on the display unit 28, the four-direction (up/down/right/left direction) button and a set button.

The controller wheel 73 is a rotationally-operable operation member included in the operation unit 70, and is used to specify a selected item together with the direction button. When the controller wheel 73 is rotationally operated, an electric pulse signal is generated in accordance with the amount of operation. Based on the pulse signal, the system control unit 50 controls the components of the digital camera 100. The pulse signal makes it possible to determine the angle by which the controller wheel 73 has been rotationally operated and the number of times the controller wheel 73 has been rotated. The controller wheel 73 may be any operation member as long as it can detect a user's rotational operation. For example, the controller wheel 73 may be a dial operation member that rotates in accordance with the user's rotational operation to generate a pulse signal. The controller wheel 73 may be an operation member including a touch sensor that does not rotate itself but detects the rotational operation of the user's finger on the controller wheel 73 (i.e., a touch wheel).

A power source control unit 80 includes a battery detection circuit, a direct current-direct current (DC-DC) converter and a switch circuit changing blocks to be energized and detects the presence or absence of attachment of a battery, the type of the battery, and the battery remaining level. The power source control unit 80 also controls the DC-DC converter based on the detection results and instructions from the system control unit 50 to supply necessary voltages to the components including the recording medium 200 for a necessary period of time.

A power source unit 40 includes a primary battery such as an alkaline battery or a lithium (Li) battery, a secondary battery such as a nickel—cadmium (NiCd) battery, a nickel metal hydride (NiMH) battery, or a Li battery, and an alternating current (AC) adapter. A recording medium interface (I/F) 18 is an interface with the recording medium 200 such as a memory card or a hard disk. The recording medium 200 is a recording medium such as a memory card for recording captured images and includes a semiconductor memory, a magnetic disc, or the like. The digital camera 100 is capable of image capturing using single-point center AF or face AF. The single-point center AF refers to performing AF on one point at the center of an imaging screen. The face AF refers to performing AF on a face in the imaging screen detected by a face detection function. In addition, the digital camera 100 can also detect a main subject in the imaging screen and perform AF on the main subject.

A subject area segmentation function will be described. The system control unit 50 sends image data to the image processing unit 24. Under control of the system control unit 50, based on the amounts of features in the image, for example, color information, the image processing unit 24 performs area segmentation by grouping adjacent pixels with similar color information, and stores the segmented areas in the memory 32. Although, in this example, the area segmentation is performed based on only the color information, luminance information may be used as additional information to perform the area segmentation.

As described above, image data to be used for live view display or playback display can be analyzed to extract the amounts of features in the image data and segment the subject area. Although, in the present exemplary embodiment, the subject area is segmented based on only the color information in the image, edge information or range information on the image mayo be used to perform the area segmentation.

Figure 3:
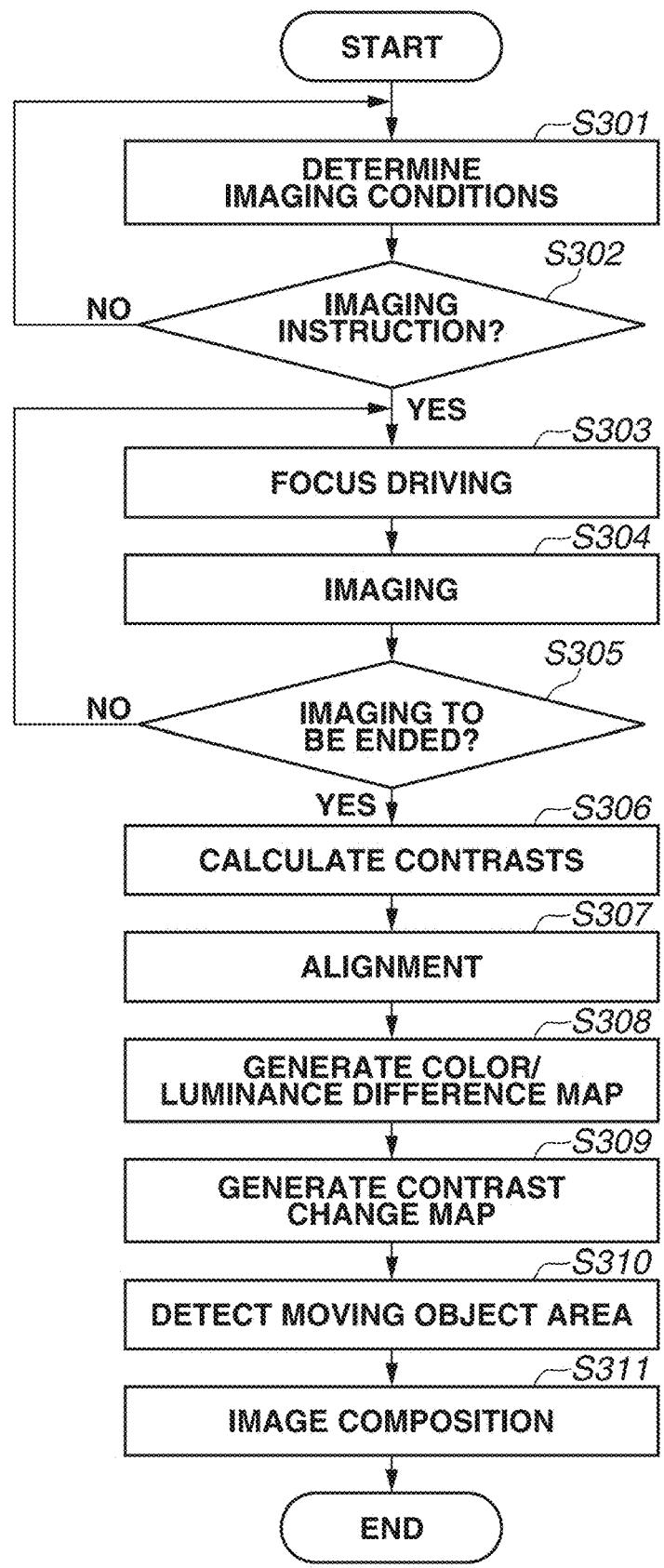
FIG. 3 is a flowchart illustrating a focus stacking method according to the exemplary embodiment of the disclosure.

Next, a focus stacking method according to the present exemplary embodiment will be described. FIG. 3 is a flowchart illustrating the focus stacking method according to the present exemplary embodiment.

When the operation mode is set to a focus-stacking imaging mode, the system control unit 50 starts live view display. In step S301, the system control unit 50 detects a user operation on the operation unit 70, and makes a focus bracket setting. Based on the user operation, the system control unit 50 sets the number of images to be captured and the amount of driving the imaging lens 103 for capturing each image.

In step S302, the system control unit 50 detects the state of the shutter button 61. If the SW2 has been pressed (YES in step S302), the processing proceeds to step S303. If the SW2 has not been pressed (NO in step S302), the processing returns to step S301.

In step S303, the image processing unit 24 generates parallax information or contrast evaluation values and performs AF processing, and moves the imaging lens 103 to the imaging start position for focus stacking based on the AF results.

In step S304, the imaging unit 22 performs image capturing and the non-volatile memory 56 stores the image data output from the imaging unit 22. In the image data captured by the imaging unit 22, the angles of view at least partially overlap, and focus positions of the image data are different along an optical axis direction.

In step S305, the system control unit 50 determines whether to end the image capturing. For example, if the predetermined number of captured images has been reached, the system control unit 50 determines that the image capturing is to be ended. The system control unit 50 determines that the image capturing is to be ended (YES in step S305), the processing proceeds to step S306. If the system control unit 50 determines that the image capturing is not to be ended (NO in step S305), the processing returns to step S303. In step S303, the imaging unit 22 continues image capturing.

In step S306, the image processing unit 24 calculates respective contrasts of the captured images. As an example of a method for calculating the contrasts, luminance Y is calculated from color signals Sr, Sg, and Sb of each pixel in each captured image using the following Equation 1:

$$Y = 0.299 Sr + 0.587 Sg + 0.114 Sb \qquad \text{(Equation 1)}$$

Then, a Sobel filter is used on a matrix L of 3×3 pixels with the luminance Y to calculate a contrast value I as described in the following Equations 2, 3 and 4:

$$I_h = \begin{pmatrix} -1 & 0 & 1 \\ -2 & 0 & 2 \\ -1 & 0 & 1 \end{pmatrix} \cdot L \qquad \text{(Equation 2)}$$

$$I_h = \begin{pmatrix} -1 & 0 & 1 \\ -2 & 0 & 2 \\ -1 & 0 & 1 \end{pmatrix} \cdot L \qquad \text{(Equation 3)}$$

$$I = \sqrt{I_h^2 + I_v^2} \qquad \text{(Equation 4)}$$

The above-mentioned method for calculating the contrast values is a mere example, and an edge detection filter such as a Laplacian filter or a bandpass filter allowing signals within a predetermined band may be used instead. In addition, the evaluation values may be calculated by performing filter processing with different image reduction ratios or by dividing the detection results into blocks and integrating the values in the blocks.

Next, in step S307, the image processing unit 24 aligns the captured images.

An example of alignment will be described below.

One of the captured images is set as a reference image, and the remaining images are set as target images. The image processing unit 24 aligns each of the target images with the reference image. The image processing unit 24 calculates the amounts of shifts of the target images from the reference image, and performs geometric deformation. First, the image processing unit 24 divides the reference image into a plurality of blocks. In one embodiment, the blocks have the same size. Then, search areas are set in each target image at respective positions corresponding to the positions of the blocks of the reference image. The search areas are set to have larger sizes than the blocks of the reference image. In each of the search areas of the target image, the image processing unit 24 calculates a correspondence point at which the sum of absolute difference (hereinafter, referred to as SAD) in luminance from the corresponding block of the reference image is the smallest.

The image processing unit 24 then calculates the positional shift as a vector from the center of the block in the reference image and the above-described correspondence point. In the calculation of correspondence points, the sum of squared difference (hereinafter, referred to as SSD) or normalized cross correlation (hereinafter, referred to as NCC) may be used instead of the SAD. Thereafter, the image processing unit 24 calculates a transformation coefficient from the amount of positional shift of each target image with respect to the reference image. The control unit 101 uses, for example, a projective transformation coefficient as the transformation coefficient. However, the transformation coefficient is not limited to the projective transformation coefficient and may be an affine transformation coefficient or a simplified transformation coefficient based on horizontal and vertical shifts. The image processing unit 24 uses the calculated transformation coefficient to transform the target images.

In step S308, the image processing unit 24 detects a difference in luminance and color between the captured image and an image of one frame before after the alignment. The image processing unit 24 compares the detected difference with a threshold stored in the non-volatile memory 56 and performs binarization processing on an area having a value equal to or greater than the threshold to generate a color/luminance difference map (evaluation image). Since some area may be isolated at the time of difference extraction, the difference detection may be performed in reduced images and then the detection result may be enlarged to the original image size. The isolated area said here refers to an area originally having luminance or color close to luminance or color of the surrounding area, but such an area is detected as an isolated area because the difference in luminance or color is influenced by noise in the image.

Figure 4:
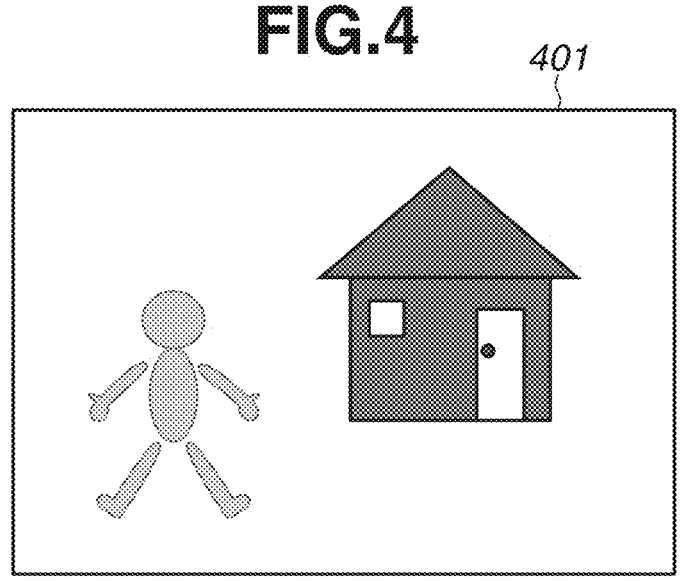
FIG. 4 is a diagram illustrating a color/luminance difference map according to the exemplary embodiment of the disclosure.
Figure 4:
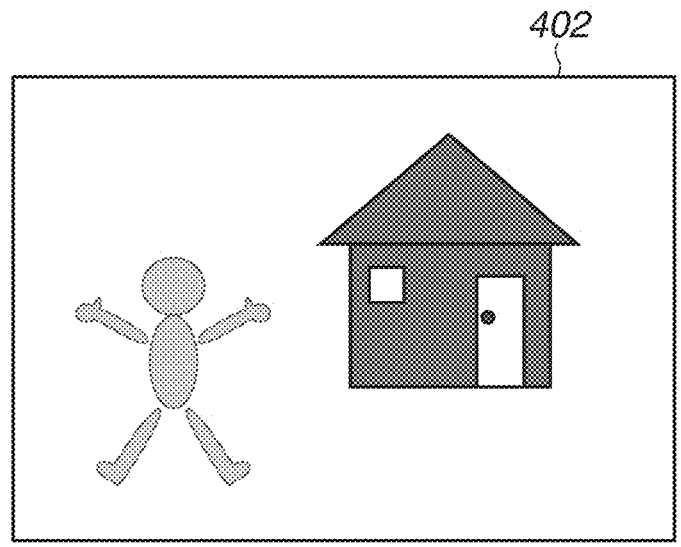
Figure 4:
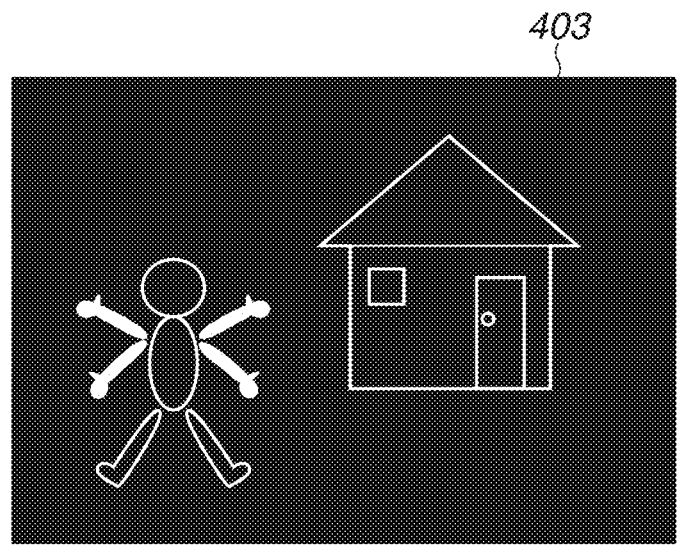

FIG. 4 is a diagram illustrating a color/luminance difference map according to the present exemplary embodiment. An image 401 and an image 402 are captured images captured in step S304 of two continuous frames after the alignment. A map 403 is the color/luminance difference map calculated by the image processing unit 24 from the image 401 and the image 402.

In step S309, the image processing unit 24 calculates contrast differences between the captured image and the image preceding by one frame after the alignment to generate a contrast change map.

Figure 5:
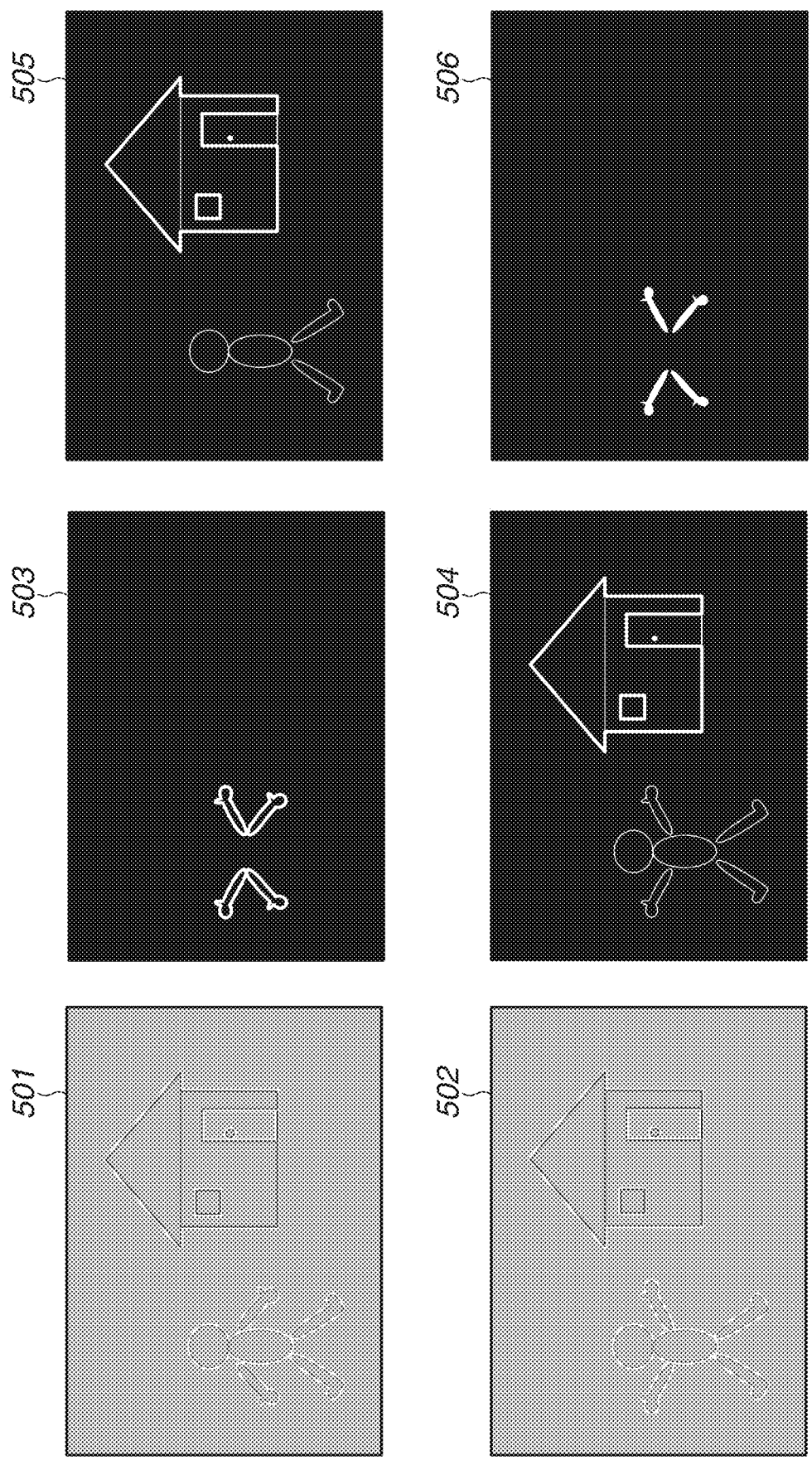
FIG. 5 is a diagram illustrating differences in contrast according to the exemplary embodiment of the disclosure.

FIG. 5 is a diagram illustrating contrast differences according to the present exemplary embodiment. An image 501 and an image 502 illustrate contrast between the captured images of the two continuous frames after the alignment.

If a still subject is normally imaged while changing the focus position, the captured images have small contrast differences because the contrast gradually changes. On the other hand, if a moving object is imaged, the contrast values of the captured images do not correspond to changes in the focus position, and thus the contrast values tend to change sharply. The image processing unit 24 compares the detected contrast changes with a preset threshold in the non-volatile memory 56 and performs binarization on the areas with values equal to or greater than the threshold to extract the areas with great contrast changes.

An image 503 in FIG. 5 illustrates areas with values equal to or greater than the threshold, extracted by the binarization. The above-mentioned threshold may be changed in accordance with the driving amount of the focus lens set in step S301. For example, if the driving amount of the focus lens is large, the amount of blurring due to the movement of the focus lens greatly changes. This is because, as the driving amount of the focus lens is large, the contrast change resulting from a change in the focus position also becomes large. Thus, the threshold is set to a greater value. In one embodiment, only the areas with positive contrast change ratios may be used.

Figure 6:
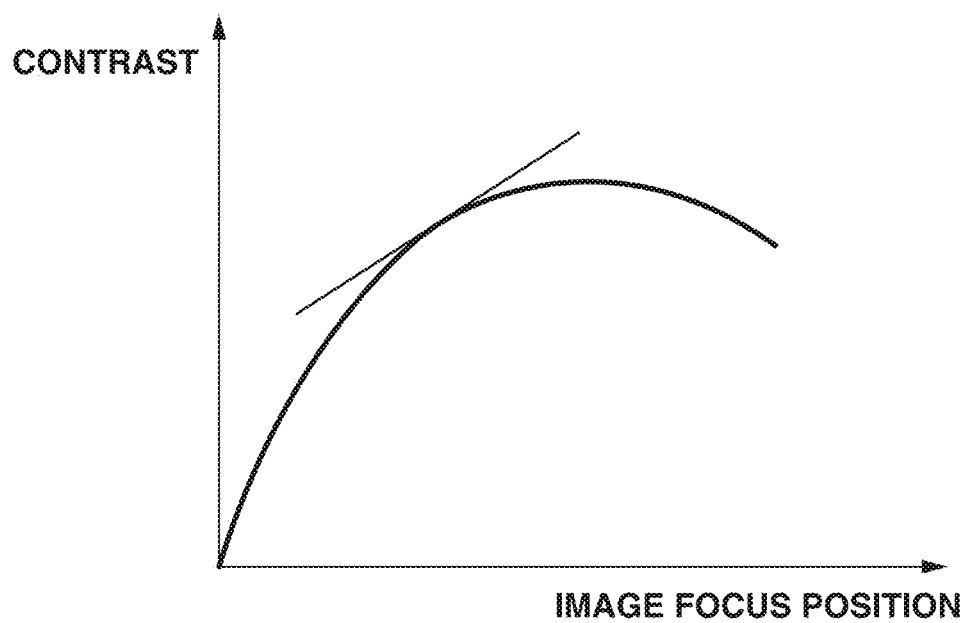
FIG. 6 is a graph illustrating changes in contrast according to the exemplary embodiment of the disclosure.

The contrast change ratio can be calculated from, for example, an inclination of a contrast change curve. FIG. 6 is a graph illustrating contrast changes according to the present exemplary embodiment. As illustrated in FIG. 6, the image processing unit 24 can calculate the change ratio from the inclination of the contrast change curve.

Figure 7:
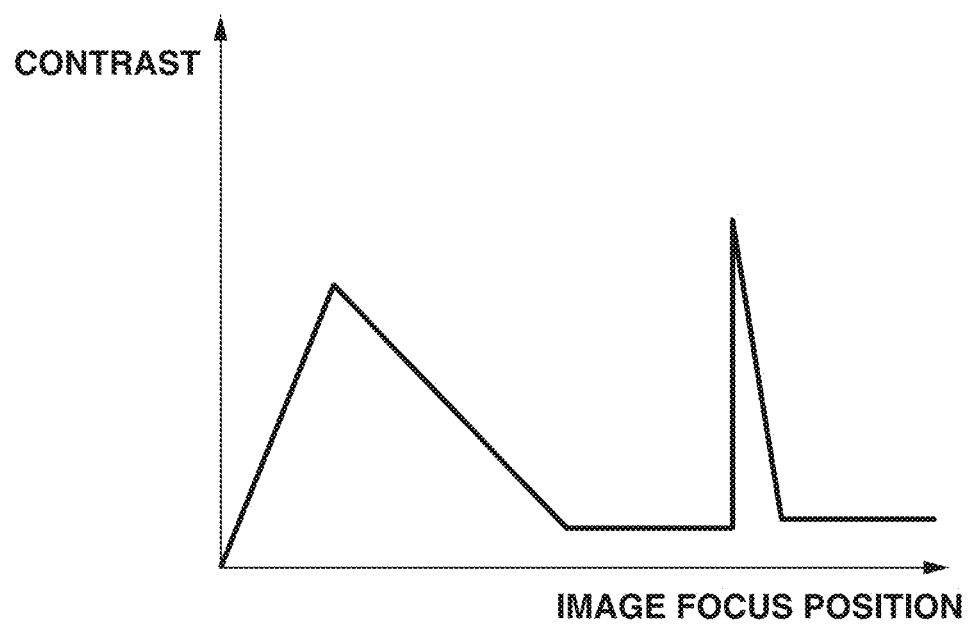
FIG. 7 is a graph illustrating sharp changes in contrast according to the exemplary embodiment of the disclosure.

FIG. 7 is a graph illustrating an example of sharp contrast changes according to the present exemplary embodiment. In such a case as illustrated in FIG. 7, it can be determined that there is a high possibility that a moving object is present as described above.

As in the case of the color/luminance difference detection, since some area may be isolated at the time of difference extraction, the contrast difference detection may be performed using images reduced in size and then the detection result may be enlarged to the original image size.

In step S310, the image processing unit 24 performs moving object detection. First, the image processing unit 24 subtracts a contrast change map 505 from the color/luminance difference map 403. Since both the color/luminance difference map and the contrast change map include differences caused by focus movement, the differences caused by the movement of the subject can be calculated by the subtraction. In the example of FIG. 5, an image 506 illustrates areas of the detected moving objects.

In step S310, the image processing unit 24 performs focus stacking excluding the moving objects detected in step S310 to generate a composite image.

As described above, in the present exemplary embodiment, in performing focus stacking, a moving object can be detected based on color or luminance differences and at the same time, wrong detection of a subject based on color or luminance differences caused by blurring can be prevented.

Other Exemplary Embodiments

In the above-described exemplary embodiment, a digital camera for personal use is taken as an example. However, the present exemplary embodiment is also applicable to portable devices, smartphones, or network cameras connected to a server as long as they have a panoramic imaging function and a composition function.

The disclosure can be realized by supplying a program implementing one or more functions in the above-mentioned exemplary embodiment to a system or apparatus via a network or a recording medium and by reading and activating the program by using one or more processors in the system or apparatus. The aspect of the embodiments can also be realized by a circuit implementing the one or more functions (for example, an application specific integrated circuit (ASIC)).

According to the configuration of the aspect of the embodiments, in an image processing apparatus detecting a moving object from a plurality of images different in focus position, it is possible to prevent wrong detection of moving object areas.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-053339, filed Mar. 26, 2021, which is hereby incorporated by reference herein in its entirety.

What is claimed is:

1. An apparatus, comprising:
at least one memory configured to store instructions; and
at least one processor in communication with the at least one memory and configured to execute the instructions to:
acquire a first evaluation value related to a change in color or luminance from a plurality of images different in focus position;
acquire a second evaluation value related to a change in contrast from the plurality of images; and
detect a moving object from the plurality of images based on the first evaluation value and the second evaluation value.

2. The apparatus according to claim 1, wherein the at least one processor further executes instructions to acquire the first evaluation value based on the plurality of images after being reduced in size.

3. The apparatus according to claim 1, wherein the at least one processor further executes instructions to acquire the second evaluation value based on the plurality of images after being reduced in size.

4. The apparatus according to claim 1, wherein the at least one processor further executes instructions to:
generate a first evaluation image based on the first evaluation value;
generate a second evaluation image based on the second evaluation value; and
determine an area present in the first evaluation image and not present in the second evaluation image as an area where the moving object exists.

5. The apparatus according to claim 1, wherein the change in contrast is a difference in contrast at a corresponding position.

6. The apparatus according to claim 5, wherein the at least one processor further executes instructions to acquire the difference based on an inclination of a curve of the change in contrast at the corresponding position.

7. The apparatus according to claim 5, wherein the corresponding position is a position of each of the plurality of images located at the same position after alignment.

8. The apparatus according to claim 1, wherein the plurality of images have at least partially overlapping angles of view.

9. The apparatus according to claim 1, wherein the at least one processor further executes instructions to combine the plurality of images to generate a composite image.

10. The apparatus according to claim 9, wherein a depth of field of the composite image is deeper than a depth of field of any of the plurality of images.

11. The apparatus according to claim 9, wherein the at least one processor further executes instructions to generate the composite image by extracting focused areas from the plurality of images.

12. The apparatus according to claim 1, wherein the plurality of images is different in focus position along an optical axis direction.

13. An apparatus, comprising:
at least one memory configured to store instructions; and
at least one processor in communication with the at least one memory and configured to execute the instructions to:
capture a plurality of images different in focus position;
acquire a first evaluation value related to a change in color or luminance from the plurality of images different in focus position;
acquire a second evaluation value related to a change in contrast from the plurality of images; and
detect a moving object from the plurality of images based on the first evaluation value and the second evaluation value.

14. The apparatus according to claim 13, wherein the at least one processor further executes instructions to:
acquire the first evaluation value based on the plurality of images after being reduced in size; and
acquire the second evaluation value based on the plurality of images after being reduced in size.

15. A method comprising:
- first evaluating for acquiring a first evaluation value related to a change in color or luminance from the plurality of images different in focus position;
- second evaluating for acquiring a second evaluation value related to a change in contrast from the plurality of images; and
- detecting a moving object from the plurality of images based on the first evaluation value and the second evaluation value.

16. The method according to claim 15, further comprising:
- acquiring the first evaluation value based on the plurality of images after being reduced in size; and
- acquiring the second evaluation value based on the plurality of images after being reduced in size.

17. The method according to claim 15, further comprising:
- generating a first evaluation image based on the first evaluation value;
- generating a second evaluation image based on the second evaluation value; and
- determining an area present in the first evaluation image and not present in the second evaluation image as an area where the moving object exists.

18. A non-transitory computer-readable storage medium which stores a program for causing a computer of an image pickup apparatus to execute a method comprising:
- first evaluating for acquiring a first evaluation value related to a change in color or luminance from the plurality of images different in focus position;
- second evaluating for acquiring a second evaluation value related to a change in contrast from the plurality of images; and
- detecting a moving object from the plurality of images based on the first evaluation value and the second evaluation value.

19. The non-transitory computer-readable storage medium according to claim 18, further comprising:
- acquiring the first evaluation value based on the plurality of images after being reduced in size; and
- acquiring the second evaluation value based on the plurality of images after being reduced in size.

20. The non-transitory computer-readable storage medium according to claim 18, further comprising:
- generating a first evaluation image based on the first evaluation value;
- generating a second evaluation image based on the second evaluation value; and
- determining an area present in the first evaluation image and not present in the second evaluation image as an area where the moving object exists.

* * * * *